United States Patent
Kim et al.

(10) Patent No.: US 12,537,036 B2
(45) Date of Patent: Jan. 27, 2026

(54) STORAGE DEVICE, NON-VOLATILE MEMORY DEVICE, AND METHOD OF OPERATING THE NON-VOLATILE MEMORY DEVICE TO MONITOR REPEATED DATA PATTERNS

(71) Applicant: Samsung Electronics Co., Ltd., Suwon-si (KR)

(72) Inventors: You Hwan Kim, Suwon-si (KR); Kyung Duk Lee, Suwon-si (KR); Ho-Sung Ahn, Suwon-si (KR); Youn-Soo Cheon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 289 days.

(21) Appl. No.: 18/322,725

(22) Filed: May 24, 2023

(65) Prior Publication Data
US 2024/0071449 A1    Feb. 29, 2024

(30) Foreign Application Priority Data
Aug. 25, 2022    (KR) .......................... 10-2022-0107132

(51) Int. Cl.
*G11C 7/24* (2006.01)
*G11C 7/10* (2006.01)

(52) U.S. Cl.
CPC .............. *G11C 7/24* (2013.01); *G11C 7/1087* (2013.01); *G11C 7/1096* (2013.01)

(58) Field of Classification Search
None
See application file for complete search history.

(56) References Cited

U.S. PATENT DOCUMENTS

| | | | |
|---|---|---|---|
| 10,067,826 B2 | 9/2018 | Rabenalt et al. | |
| 10,090,835 B2 | 10/2018 | Park et al. | |
| 10,171,078 B2 | 1/2019 | Kim et al. | |
| 10,991,401 B2 | 4/2021 | Hwang | |
| 11,138,064 B2 | 10/2021 | Richter et al. | |
| 2021/0407573 A1* | 12/2021 | Gyllenskog | G06F 13/16 |
| 2022/0093193 A1 | 3/2022 | Wan | |
| 2022/0179724 A1* | 6/2022 | Shim | G06F 11/3055 |

FOREIGN PATENT DOCUMENTS

| | | |
|---|---|---|
| KR | 20180000789 A | 1/2018 |
| KR | 20190029056 A | 3/2019 |
| KR | 20220044015 A | 4/2022 |

\* cited by examiner

*Primary Examiner* — Alfredo Bermudez Lozada
(74) *Attorney, Agent, or Firm* — Wolf, Greenfield & Sacks, P.C.

(57) ABSTRACT

A storage device, a non-volatile memory device, and a method of operating the non-volatile memory device are provided. The storage device includes a storage controller configured to send a command and program data including a pattern of one or more bits, a non-volatile memory device configured to receive the command and the program data, and a pattern monitoring circuit configured to monitor a pattern of the program data sent from the storage controller. The pattern monitoring circuit is configured to send an abnormal status check bit to the storage controller when the program data includes repeated patterns that are repeated a preset number of times or more, and the storage controller is configured to resend the program data to the non-volatile memory device in response to receiving the abnormal status check bit.

20 Claims, 15 Drawing Sheets

PGM Data

FIG. 8

| DQ | prev.DQ | Counter (Count Value) | Status Check Bit |
|---|---|---|---|
| 00 | · | 0 | 0 |
| 00 | 00 | 1 | 0 |
| 00 | 00 | 2 | 0 |
| 31 | 00 | 0 | 0 |
| 4C | 31 | 0 | 0 |
| D8 | 4C | 0 | 0 |
| 7E | D8 | 0 | 0 |
| 65 | 7E | 0 | 0 |
| E7 | 65 | 0 | 0 |

Normal Case

FIG. 9

| DQ | prev.DQ | Counter (Count Value) | Status Check Bit |
|----|---------|----------------------|------------------|
| 00 | · | 0 | 0 |
| 00 | 00 | 1 | 0 |
| 00 | 00 | 2 | 0 |
| 00 | 00 | 3 | 0 |
| 00 | 00 | 4 | 1 |
| 8A | 00 | 0 | 1 |
| 3D | 8A | 0 | 1 |
| 17 | 3D | 0 | 1 |
| 93 | 17 | 0 | 1 |

Defect Case

STORAGE DEVICE, NON-VOLATILE MEMORY DEVICE, AND METHOD OF OPERATING THE NON- VOLATILE MEMORY DEVICE TO MONITOR REPEATED DATA PATTERNS

This application claims the benefit of Korean Patent Application No. 10-2022-0107132, filed on Aug. 25, 2022, in the Korean Intellectual Property Office, the disclosure of which is incorporated herein in its entirety by reference.

BACKGROUND

The present disclosure relates to a storage device, a non-volatile memory device, and a method of operating the non-volatile memory device.

As solution products such as solid state drive (SSD) and universal flash storage (UFS) have higher capacity and performance, an input/output frequency of a NAND flash memory is increasingly increasing. Accordingly, signal integrity (SI) characteristics of the NAND flash memory are increasingly deteriorating. Therefore, on-die termination (ODT) and frequency boosting interface (FBI) are used to improve the SI characteristics of the NAND flash memory. However, due to environmental factors such as the operating environment and noise of the solution products, a host sometimes sends unintended data, for example, continuously sending the same data pattern to the NAND flash memory. In this regard, research is being conducted on a method of monitoring the pattern of data input to a NAND flash memory to prevent, in advance, unintended data from being programmed into the NAND flash memory.

SUMMARY

Aspects of the present disclosure provide a storage device which prevents, in advance, abnormal data from being programmed into a non-volatile memory device.

Aspects of the present disclosure also provide a method of operating a non-volatile memory device which prevents, in advance, abnormal data from being programmed thereto.

Aspects of the present disclosure also provide a non-volatile memory device which prevents, in advance, abnormal data from being programmed thereto.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to some embodiments of the present disclosure, there is provided a storage device including a storage controller configured to send a command and configured to send program data including a pattern of one or more bits, a non-volatile memory device configured to receive the command and configured to receive the program data, and a pattern monitoring circuit configured to monitor the program data from the storage controller for a pattern. The pattern monitoring circuit sends an abnormal status check bit to the storage controller when the program data includes repeated patterns that are repeated a preset number of times or more, and the storage controller is configured to resend the program data to the non-volatile memory device in response to receiving the abnormal status check bit.

According to some embodiments of the present disclosure, there is provided a method of operating a non-volatile memory device, the method including receiving a program command from a storage controller, receiving a data input command from the storage controller, receiving program data including a pattern of one or more bits from the storage controller, receiving a status check command from the storage controller, monitoring the program data, generating an abnormal status check bit when the program data includes repeated patterns that are repeated a preset number of times or more, sending the abnormal status check bit to the storage controller, and receiving resent program data from the storage controller again on the abnormal status check bit.

According to some embodiments of the present disclosure, there is provided a non-volatile memory device including an input/output circuit configured to receive randomized program data from a storage controller, and a pattern monitoring circuit configured to receive the randomized program data from the input/output circuit and configured to monitor the randomized program data for a pattern. The pattern monitoring circuit includes a counter that is configured to generate a count value based on whether the randomized program data is repeated, a status check bit generator that is configured to generate a status check bit based on the count value, and configured to send the status check bit to the storage controller.

It should be noted that the effects of the present disclosure are not limited to those described above, and other effects of the present disclosure will be apparent from the following description.

BRIEF DESCRIPTION OF THE DRAWINGS

These and/or other aspects will become apparent and more readily appreciated from the following description of the embodiments, taken in conjunction with the accompanying drawings in which:

FIG. 6 is an example diagram for explaining an error in program data according to some embodiments;

FIG. 8 is an example diagram for explaining a count value and a normal status check bit according to some embodiments;

FIG. 9 is an example diagram for explaining a count value and an abnormal status check bit according to some embodiments;

DETAILED DESCRIPTION

Hereinafter, embodiments according to the technical spirit of the present disclosure will be described with reference to the accompanying drawings.

Figure 1:
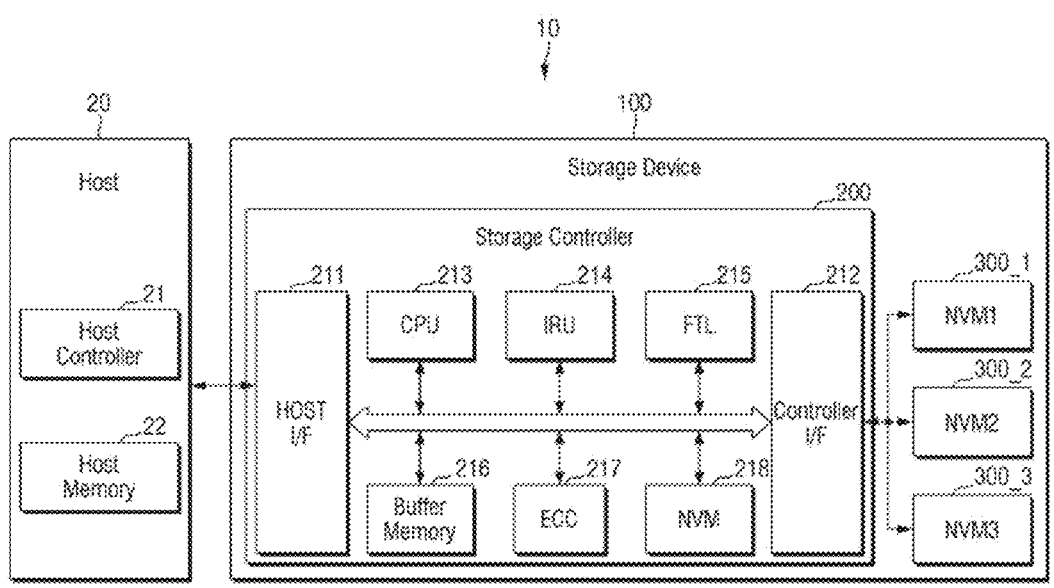
FIG. 1 is a block diagram of a storage system according to some embodiments.

FIG. 1 is a block diagram of a storage system 10 according to some embodiments.

Referring to FIG. 1, the storage system 10 may include a host 20 and a storage device 100. In addition, the storage device 100 may include a storage controller 200 and a plurality of non-volatile memory devices 300_1, 300_2, and 300_3. In addition, in some embodiments, the host 20 may include a host controller 21 and a host memory 22. The host memory 22 may function as a buffer memory for temporarily storing data to be sent to the storage device 100 or data sent from the storage device 100.

The storage device 100 may include storage media for storing data according to a request from the host 20. For example, the storage device 100 may include at least one of a solid state drive (SSD), an embedded memory, and a removable external memory. When the storage device 100 is an SSD, it may be a device conforming to a non-volatile memory express (NVMe) standard. When the storage device 100 is an embedded memory or an external memory, it may be a device conforming to a universal flash storage (UFS) standard or an embedded multi-media card (eMMC) standard. Each of the host 20 and the storage device 100 may generate and send a packet according to an adopted standard protocol.

When the non-volatile memory devices 300_1 through 300_3 include flash memories, each of the flash memories may include a 2D NAND memory array or a 3D (or vertical or bonding vertical) NAND (VNAND) memory array. As another example, the storage device 100 may include various other types of non-volatile memories. For example, magnetic random access memories (MRAMs), spin-transfer torque MRAMs, conductive bridging random access memories (CBRAMs), ferroelectric random access memories (FeRAMs), phase-change random access memories (PRAMs), resistive random access memories (RRAM), or various other types of memories may be applied to the storage device 100.

According to some embodiments, the host controller 21 and the host memory 22 may be implemented as separate semiconductor chips. In some embodiments, the host controller 21 and the host memory 22 may be integrated on the same semiconductor chip. For example, the host controller 21 may be any one of a plurality of modules provided in an application processor, and the application processor may be implemented as a system on chip (SoC). In addition, the host memory 22 may be an embedded memory provided in the application processor or may be a volatile memory or a memory module disposed outside the application processor.

The host controller 21 may manage an operation of storing data (e.g., write data) of the host memory 22 in the non-volatile memory devices 300_1 through 300_3 or storing data (e.g., read data) of the non-volatile memory devices 300_1 through 300_3 in the host memory 22.

The storage controller 200 may include a host interface 211, a controller interface 212, and a central processing unit (CPU) 213. In addition, the storage controller 200 may further include an index read unit (IRU) 214, a flash translation layer (FTL) 215, a buffer memory 216, an error correction code (ECC) engine 217, and an internal non-volatile memory 218. The storage controller 200 may further include a working memory into which the FTL 215 is loaded, and the CPU 213 may control data write and read operations on a non-volatile memory by executing the FTL 215.

The host interface 211 may send/receive packets to/from the host 20. A packet sent from the host 20 to the host interface 211 may include a command or data to be written to the non-volatile memory devices 300_1 through 300_3. A packet sent from the host interface 211 to the host 20 may include a response to a command or data read from the non-volatile memory devices 300_1 through 300_3. The controller interface 212 may send data to be written to the non-volatile memory devices 300_1 through 300_3 to the non-volatile memory devices 300_1 through 300_3 or may receive data read from the non-volatile memory devices 300_1 through 300_3. The controller interface 212 may be implemented to comply with a standard protocol such as Toggle or ONFI.

The FTL 215 may perform various functions such as address mapping, wear-leveling, and garbage collection. In addition, the buffer memory 216 may temporarily store data to be written to the non-volatile memory devices 300_1 through 300_3 or data read from the non-volatile memory devices 300_1 through 300_3. The buffer memory 216 may be provided in the storage controller 200, but may also be disposed outside the storage controller 200.

The ECC engine 217 may perform an error detection and correction function on data read from the non-volatile memory devices 300_1 through 300_3. More specifically, the ECC engine 217 may generate parity bits for write data to be written to the non-volatile memory devices 300_1 through 300_3. The generated parity bits may be stored in the non-volatile memory devices 300_1 through 300_3 together with the write data. When data is read from the non-volatile memory devices 3001 through 300_3, the ECC engine 217 may correct an error in the read data using parity bits read from the non-volatile memory devices 300_1 through 300_3 together with the read data and may output the error-corrected read data.

Figure 2:
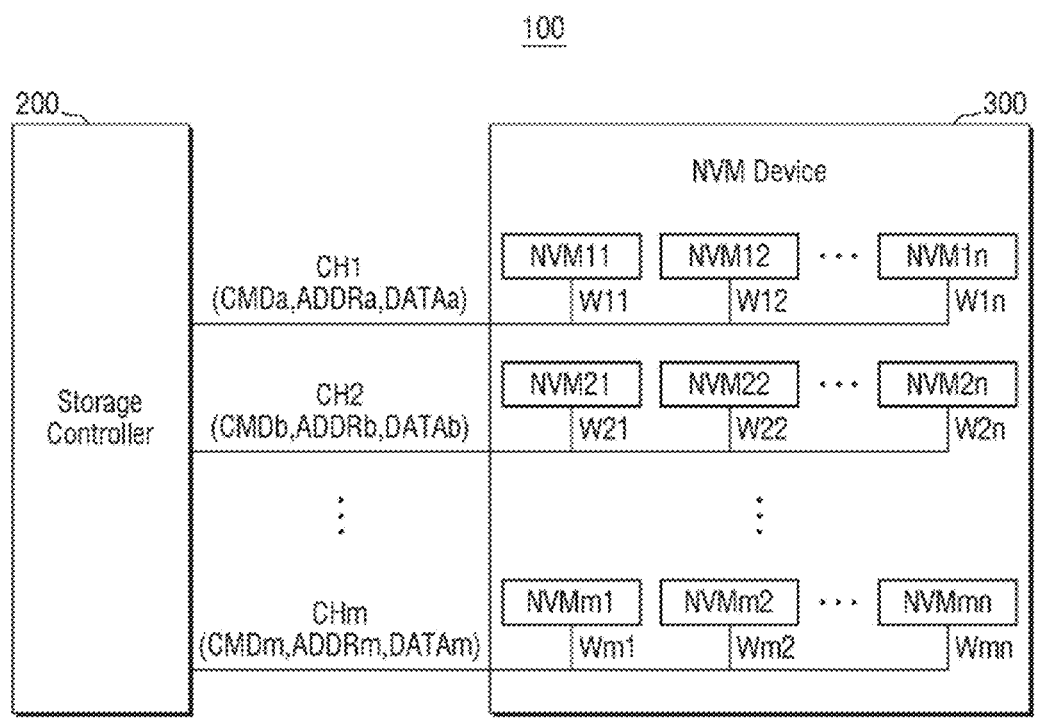
FIG. 2 is a block diagram of a storage device according to some embodiments.

FIG. 2 is a block diagram of a storage device 100 according to some embodiments.

Referring to FIG. 2, non-volatile memory devices 300 and a storage controller 200 may be connected through a plurality of channels CH1 through CHm. For example, the storage device 100 may be implemented as a storage device such as an SSD.

The non-volatile memory devices 300 may include a plurality of non-volatile memory devices NVM11 through NVMmn. Each of the non-volatile memory devices NVM11 through NVMmn may be connected to one of the channels CH1 through CHm through a corresponding connection W11 to Wmn. In an example embodiment, each of the non-volatile memory devices NVM11 through NVMmn may be implemented as an arbitrary memory unit that can operate according to an individual command from the storage controller 200. For example, each of the non-volatile memory devices NVM11 through NVMmn may be implemented as a chip or a die, but the present disclosure is not limited thereto.

The storage controller 200 may send/receive signals to/from the non-volatile memory devices 300 through the channels CH1 through CHm. For example, the storage controller 200 may send commands CMDa through CMDm, addresses ADDRa through ADDRm and data DATAa through DATAm to the non-volatile memory devices 300 or receive data DATAa through DATAm from the non-volatile memory devices 300 through the channels CH1 through CHm.

The storage controller 200 may select one of the non-volatile memory devices 300 which is connected to each channel and send/receive signals to/from the selected non-volatile memory device through the channel.

The storage controller 200 may send/receive signals to/from the non-volatile memory devices 300 in parallel through different channels. For example, the storage controller 200 may send a command CMDb to a memory device NVM21 through a second channel CH2 while sending a command CMDa to a memory device NVM11 through a first channel CH1. For example, the storage controller 200 may receive data DATAb from the memory device NVM21 through the second channel CH2 while receiving data DATAa from the memory device NVM11 through the first channel CH1.

In FIG. 2, the non-volatile memory devices 300 communicate with the storage controller 200 through m channels and include n non-volatile memory devices respectively corresponding to the channels. However, the number of channels and the number of non-volatile memory devices connected to each channel can vary.

Figure 3:
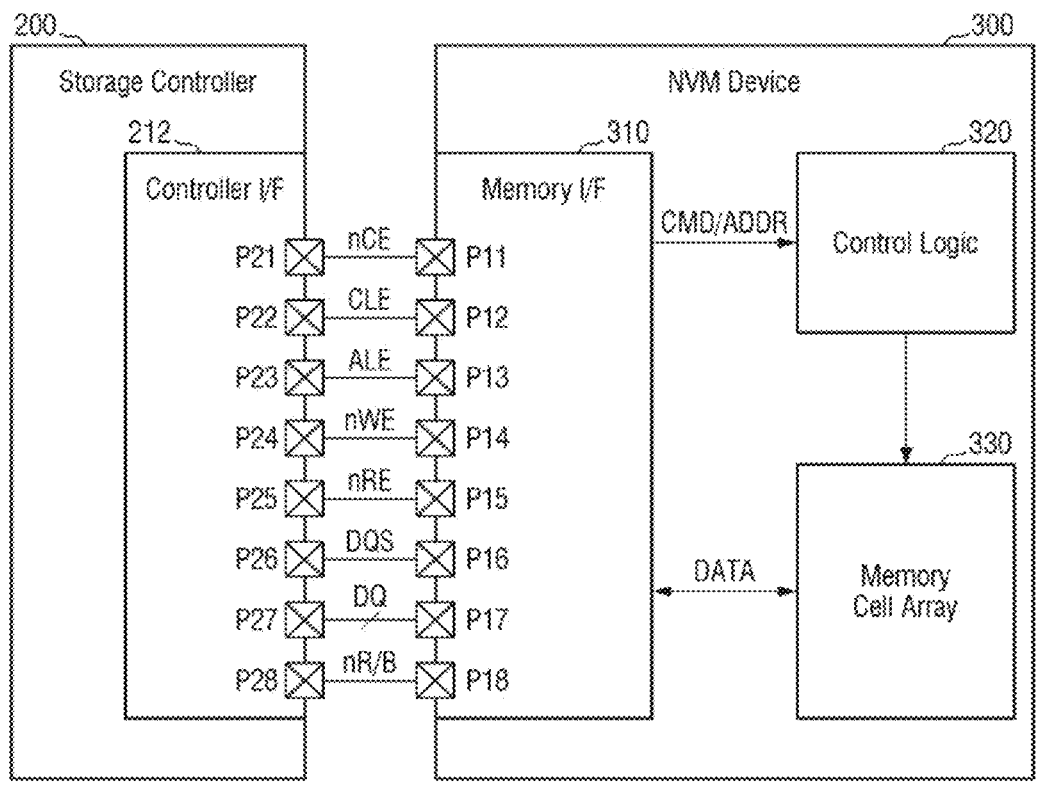
FIG. 3 is a block diagram of a storage device according to some embodiments.

FIG. 3 is a block diagram of a storage device 100 according to some embodiments.

Referring to FIG. 3, the storage device 100 may include a storage controller 200 and a non-volatile memory device 300. The non-volatile memory device 300 may correspond to one of the non-volatile memory devices NVM11 through NVMmn according to some embodiments which communicates with the storage controller 200 of FIG. 2 based on one of the channels CH1 through CHm of FIG. 2.

The non-volatile memory device 300 may include first through eighth pins P11 through P18, a memory interface circuit 310, a control logic circuit 320, and a memory cell array 330.

The memory interface circuit 310 may receive a chip enable signal nCE from the storage controller 200 through the first pin P11. The memory interface circuit 310 may send/receive signals to/from the storage controller 200 through the second through eighth pins P12 through P18 according to the chip enable signal nCE. For example, when the chip enable signal nCE is in an enable state (e.g., a high level), the memory interface circuit 310 may send/receive signals to/from the storage controller 200 through the second through eighth pins P12 through P18.

The memory interface circuit 310 may receive a command latch enable signal CLE, an address latch enable signal ALE, and a write enable signal nWE from the storage controller 200 through the second through fourth pins P12 through P14. The memory interface circuit 310 may receive a data signal DQ from the storage controller 200 or send the data signal DQ to the storage controller 200 through the seventh pin P17. A command CMD, an address ADDR, and data DATA may be sent through the data signal DQ. For example, the data signal DQ may be sent through a plurality of data signal lines. In this case, the seventh pin P17 may include a plurality of pins corresponding to a plurality of data signals.

The memory interface circuit 310 may obtain the command CMD from the data signal DQ received in an enable period (e.g., a high level state) of the command latch enable signal CLE based on toggle timings of the write enable signal nWE. The memory interface circuit 310 may obtain the address ADDR from the data signal DQ received in an enable period (e.g., a high level state) of the address latch enable signal ALE based on the toggle timings of the write enable signal nWE.

In an example embodiment, the write enable signal nWE may maintain a static state (e.g., a high level or a low level) and then toggle between a high level and a low level. For example, the write enable signal nWE may toggle in a period in which the command CMD or the address ADDR is sent. Accordingly, the memory interface circuit 310 may obtain the command CMD or the address ADDR based on the toggle timings of the write enable signal nWE.

The memory interface circuit 310 may receive a read enable signal nRE from the storage controller 200 through the fifth pin P15. The memory interface circuit 310 may receive a data strobe signal DQS from the storage controller 200 or send the data strobe signal DQS to the storage controller 200 through the sixth pin P16.

In a data output operation of the non-volatile memory device 300, the memory interface circuit 310 may receive the read enable signal nRE that toggles through the fifth pin P15 before outputting the data DATA. The memory interface circuit 310 may generate the data strobe signal DQS that toggles based on the toggling of the read enable signal nRE. For example, the memory interface circuit 310 may generate the data strobe signal DQS that starts to toggle after a predetermined delay (e.g., tDQSRE) from a toggling start time of the read enable signal nRE. The memory interface circuit 310 may send the data signal DQ including the data DATA based on the toggle timing of the data strobe signal DQS. Accordingly, the data DATA may be aligned with the toggle timing of the data strobe signal DQS and sent to the storage controller 200.

In a data input operation of the non-volatile memory device 300, when the data signal DQ including the data DATA is received from the storage controller 200, the memory interface circuit 310 may receive the toggling data strobe signal DQS from the storage controller 200 together with the data DATA. The memory interface circuit 310 may obtain the data DATA from the data signal DQ based on the toggle timing of the data strobe signal DQS. For example, the memory interface circuit 310 may obtain the data DATA by sampling the data signal DQ at a rising edge and a falling edge of the data strobe signal DQS.

The memory interface circuit 310 may send a ready/busy output signal nR/B to the storage controller 200 through the eighth pin P18. The memory interface circuit 310 may send state information of the non-volatile memory device 300 to the storage controller 200 through the read/busy output signal nR/B. When the non-volatile memory device 300 is in a busy state (that is, when internal operations of the non-volatile memory device 300 are being performed), the memory interface circuit 310 may send the ready/busy output signal nR/B indicating the busy state to the storage controller 200. When the non-volatile memory device 300 is in a ready state (that is, when the internal operations of the non-volatile memory device 300 are not performed or are completed), the memory interface circuit 310 may send the ready/busy output signal nR/B indicating the ready state to the storage controller 200. For example, while the non-volatile memory device 300 reads the data DATA from the memory cell array 330 in response to a page read command, the memory interface circuit 310 may send the ready/busy output signal nR/B indicating the busy state (e.g., a low level) to the storage controller 200. For example, while the non-volatile memory device 300 programs the data DATA into the memory cell array 330 in response to a program command, the memory interface circuit 310 may send the ready/busy output signal nR/B indicating the busy state to the storage controller 200.

The control logic circuit 320 may generally control various operations of the non-volatile memory device 300. The control logic circuit 320 may receive the obtained command/address CMD/ADDR from the memory interface circuit 310. The control logic circuit 320 may generate control signals for controlling other components of the non-volatile memory device 300 according to the received command/address CMD/ADDR. For example, the control logic circuit 320 may generate various control signals for programming the data DATA to the memory cell array 330 or reading the data DATA from the memory cell array 330. In some embodiments, the control logic circuit 320 may generate control signals for adjusting a channel potential in the memory cell array 330.

The memory cell array 330 may store the data DATA obtained from the memory interface circuit 310 under the control of the control logic circuit 320. The memory cell array 330 may output the stored data DATA to the memory interface circuit 310 under the control of the control logic circuit 320. In addition, the channel potential in the memory cell array 330 may be adjusted under the control of the control logic circuit 320.

The memory cell array 330 may include a plurality of memory cells. For example, the memory cells may be flash memory cells. However, the present disclosure is not limited thereto, and the memory cells may also be RRAM cells, FRAM cells, PRAM cells, thyristor random access memory (TRAM) cells, or MRAM cells. Embodiments will be described below, focusing on an embodiment in which the memory cells are NAND flash memory cells.

The storage controller 200 may include first through eighth pins P21 through P28 and a controller interface 212. The first through eighth pins P21 through P28 may correspond to the first through eighth pins P11 through P18 of the non-volatile memory device 300.

The controller interface 212 may send the chip enable signal nCE to the non-volatile memory device 300 through the first pin P21. The controller interface 212 may send/receive signals to/from the non-volatile memory device 300, which is selected through the chip enable signal nCE, through the second through eighth pins P22 through P28.

The controller interface 212 may send the command latch enable signal CLE, the address latch enable signal ALE, and the write enable signal nWE to the non-volatile memory device 300 through the second through fourth pins P22 through P24. The controller interface 212 may send the data signal DQ to the non-volatile memory device 300 or receive the data signal DQ from the non-volatile memory device 300 through the seventh pin P27.

The controller interface 212 may send the data signal DQ including the command CMD or the address ADDR to the non-volatile memory device 300 together with the write enable signal nWE that toggles. The controller interface 212 may send the data signal DQ including the command CMD to the non-volatile memory device 300 by sending the command latch enable signal CLE having the enable state and may send the data signal DQ including the address ADDR to the non-volatile memory device 300 by sending the address latch enable signal ALE having the enable state.

The controller interface 212 may send the read enable signal nRE to the non-volatile memory device 300 through the fifth pin P25. The controller interface 212 may receive the data strobe signal DQS from the non-volatile memory device 300 or send the data strobe signal DQS to the non-volatile memory device 300 through the sixth pin P26.

In a data output operation of the non-volatile memory device 300, the controller interface 212 may generate the read enable signal nRE that toggles, and send the read enable signal nRE to the non-volatile memory device 300. For example, the controller interface 212 may generate the read enable signal nRE that is changed from a static state (e.g., a high level or a low level) to a toggle state before the data DATA is output. Accordingly, the non-volatile memory device 300 may generate the data strobe signal DQS that toggles based on the read enable signal nRE. The controller interface 212 may receive the data signal DQ including the data DATA from the non-volatile memory device 300 together with the toggling data strobe signal DQS. The controller interface 212 may obtain the data DATA from the data signal DQ based on the toggle timing of the data strobe signal DQS.

In a data input operation of the non-volatile memory device 300, the controller interface 212 may generate the data strobe signal DQS that toggles. For example, the controller interface 212 may generate the data strobe signal DQS that is changed from a static state (e.g., a high level or a low level) to a toggle state before sending the data DATA. The controller interface 212 may send the data signal DQ including the data DATA to the non-volatile memory device 300 based on the toggle timings of the data strobe signal DQS.

The controller interface 212 may receive the ready/busy output signal nR/B from the non-volatile memory device 300 through the eighth pin P28. The controller interface 212 may determine the state information of the non-volatile memory device 300 based on the ready/busy output signal nR/B.

Figure 4:
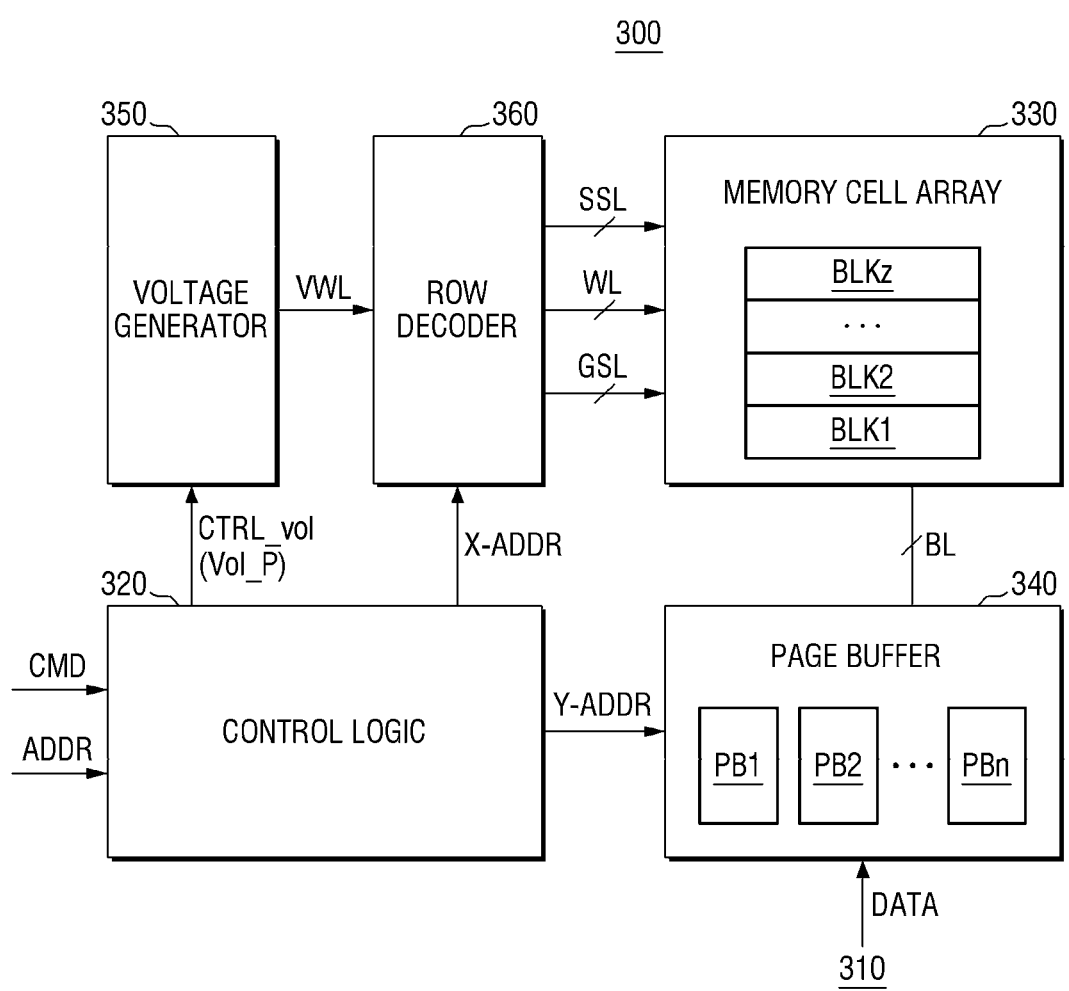
FIG. 4 is an example block diagram of a non-volatile memory device according to some embodiments.

FIG. 4 is an example block diagram of a non-volatile memory device 300 according to some embodiments.

Referring to FIG. 4, the non-volatile memory device 300 may include a control logic circuit 320, a memory cell array 330, a page buffer unit 340, a voltage generator 350, and a row decoder 360. The non-volatile memory device 300 may further include a memory interface circuit 310 and may further include column logic, a pre-decoder, a temperature sensor, a command decoder, an address decoder, and the like.

The control logic circuit 320 may generally control various operations in the non-volatile memory device 300. The control logic circuit 320 may output various control signals in response to a command CMD and/or an address ADDR from the memory interface circuit 310. For example, the control logic circuit 320 may output a voltage control signal CTRL_vol, a row address X-ADDR, and a column address Y-ADDR.

The memory cell array 330 may include a plurality of memory blocks BLK1 through BLKz (where z is a positive integer), and each of the memory blocks BLK1 through BLKz may include a plurality of memory cells. The memory cell array 330 may be connected to the page buffer unit 340 through bit lines BL and may be connected to the row decoder 360 through word lines WL, string select lines SSL and ground select lines GSL.

In example embodiments, the memory cell array 330 may include a 3D memory cell array, and the 3D memory cell array may include a plurality of NAND strings. Each NAND string may include memory cells respectively connected to word lines stacked vertically on a substrate. In example embodiments, the memory cell array 330 may include a 2D memory cell array, and the 2D memory cell array may include a plurality of NAND strings disposed along row and column directions.

The page buffer unit 340 may include a plurality of page buffers PB1 through PBn (where n is an integer of 3 or more), and the page buffers PB1 through PBn may be respectively connected to the memory cells through the bit lines BL. The page buffer unit 340 may select at least one of the bit lines BL in response to the column address Y-ADDR. The page buffer unit 340 may operate as a write driver or a sense amplifier according to an operation mode. For example, during a program operation, the page buffer unit 340 may apply a bit line voltage, which corresponds to data to be programmed, to a selected bit line. During a read operation, the page buffer unit 340 may sense or read data stored in a memory cell by sensing the current or voltage of a selected bit line.

The voltage generator 350 may generate various types of voltages for performing program, read and erase operations based on the voltage control signal CTRL_vol. For example, the voltage generator 350 may generate a program voltage, a read voltage, a program verify voltage and an erase voltage as word line voltages VWL.

The row decoder 360 may select one of the word lines WL and one of the string select lines SSL in response to the row address X-ADDR. For example, the row decoder 360 may apply a program voltage and a program verify voltage to a selected word line during a program operation and apply a read voltage to a selected word line during a read operation.

Figure 5:
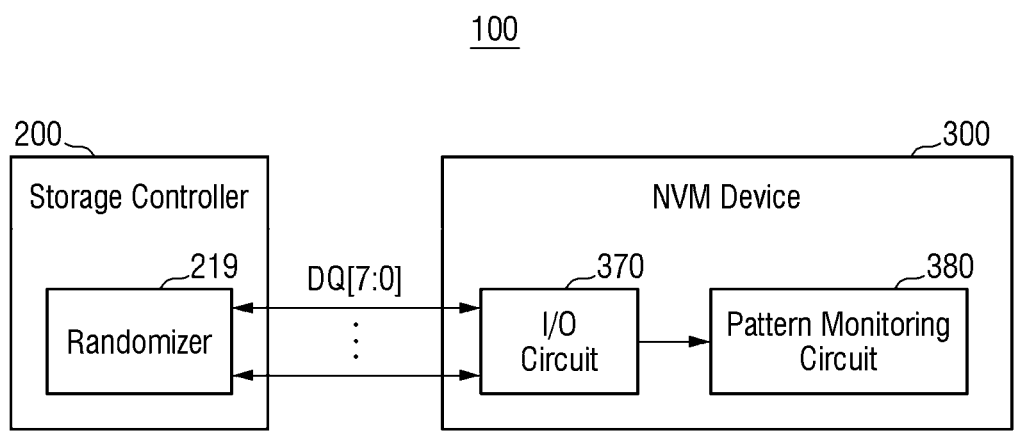
FIG. 5 is a block diagram of a storage device including a pattern monitoring circuit according to some embodiments.

FIG. 5 is a block diagram of a storage device 100 including a pattern monitoring circuit 380 according to some embodiments.

Referring to FIG. 5, in some embodiments, the storage device 100 may include a storage controller 200 and a non-volatile memory device 300. The storage controller 200 may include a randomizer 219, and the non-volatile memory device 300 may include an input/output circuit 370 and the pattern monitoring circuit 380.

Although only one non-volatile memory device 300 is illustrated in FIG. 5, a plurality of non-volatile memory devices 300 communicating data with the storage controller 200 may be implemented as described above with reference to FIGS. 1 and 2. In addition, each of the non-volatile memory devices 300 may include the input/output circuit 370 and the pattern monitoring circuit 380.

When data is programmed from the host 20 (see FIG. 1) to the non-volatile memory device 300, the host 20 (see FIG. 1) sends program data to the storage device 100, and the storage controller 200 inside the storage device 100 converts the program data and sends the converted program data to the non-volatile memory device 300.

In some embodiments, the process of converting the program data sent from the storage controller 200 to the non-volatile memory device 300 may include randomizing the order of the program data. The randomizer 219 may randomize the order of the program data to secure the reliability of the program data sent from the storage controller 200 to the non-volatile memory device 300. The randomizer 219 may send the program data with groups of bits rearranged the randomized order to the input/output circuit 370 of the non-volatile memory device 300. In some embodiments, data transmission between the storage controller 200 and the non-volatile memory device 300 may be performed using eight data signal (DQ) lines, DQ[7:0].

The input/output circuit 370 may receive the randomized program data from the randomizer 219 through the data signal (DQ) lines and send the received program data to the pattern monitoring circuit 380. The pattern monitoring circuit 380 may monitor the pattern of the program data received from the input/output circuit 370 to determine whether the program data is normal.

FIG. 6 is an example diagram for explaining an error in program data according to some embodiments.

As described above with reference to FIG. 5, data programmed into the non-volatile memory device 300 undergoes a randomization process in the randomizer 219. Therefore, it is very rare that data having the same pattern is continuously programmed into the non-volatile memory device 300. However, when noise occurs in the non-volatile memory device 300 or when an error occurs in data signal (DQ) communication between the storage controller 200 and the non-volatile memory device 300, the error of data having the same pattern being continuously programmed into the non-volatile memory device 300 may occur. For example, referring to FIG. 6, it can be seen that a '00' pattern has been continuously programmed into the non-volatile memory device 300.

Therefore, the pattern monitoring circuit 380 may monitor the pattern of program data in advance before the data is programmed into the non-volatile memory device 300. Accordingly, it is possible to monitor whether data of the same pattern is continuously received from the storage controller 200 a preset number of times or more. The pattern monitoring circuit 380 may send a status check bit to the storage controller 200 to inform the storage controller 200 of whether data of the same pattern is continuously monitored the preset number of times or more.

The preset number of times used as a criterion for determining whether the program data is normal may be stored in a UIB fuse in the non-volatile memory device 300 or may be stored in the storage controller 200.

Figure 7:
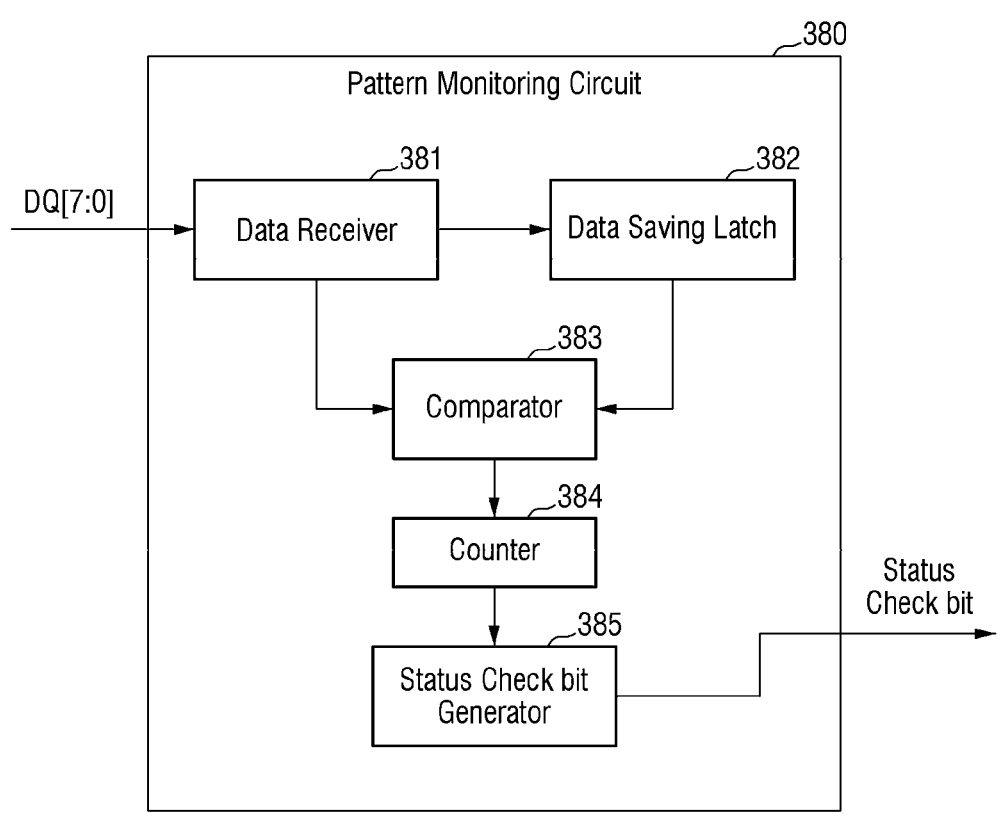
FIG. 7 is a block diagram of a pattern monitoring circuit according to some embodiments.

FIG. 7 is a block diagram of a pattern monitoring circuit 380 according to some embodiments.

Referring to FIG. 7, in some embodiments, the pattern monitoring circuit 380 may include a data receiver circuit 381, a data saving latch 382, a comparator 383, a counter 384, and a status check bit generator 385.

The data receiver circuit 381 may receive program data from the input/output circuit 370 (see FIG. 5) and store the program data. In addition, the data receiver circuit 381 may send the program data to the data saving latch 382. In some embodiments, the program data received by the data receiver circuit 381 may correspond to data whose order has been randomized by the randomizer 219 (see FIG. 5). The data saving latch 382 may temporarily store the program data received from the data receiver circuit 381. That is, when a plurality of pieces of program data are sequentially input to the pattern monitoring circuit 380, previous program data may be stored in the data saving latch 382, and current program data may be stored in the data receiver circuit 381.

The comparator 383 may receive the current program data from the data receiver circuit 381 and receive the previous program data from the data saving latch 382. The comparator 383 may check whether the current program data matches the previous program data by comparing the received data.

The counter 384 may generate and store a count value based on the comparison result of the comparator 383. For example, the counter 384 may increase the count value by one when the current program data matches the previous program data. In addition, the counter 384 may initialize or set the count value to zero when the current program data does not match the previous program data.

The status check bit generator 385 may generate a status check bit based on the count value stored in the counter 384 and the preset number of times, and the storage controller 200 (see FIG. 5) may send the status check bit to the storage controller 200 (see FIG. 5). For example, assuming that the preset number of times program data is repeated is N times, when the count value stored in the counter 384 is N−1, the status check bit generator 385 may generate an abnormal status check bit (a bit value of 1) and send the abnormal status check bit to the storage controller 200 (see FIG. 5). In addition, when the count value stored in the counter 384 is smaller than N−1, the status check bit generator 385 may generate a normal status check bit (a bit value of 0) and send the normal status check bit to the storage controller 200 (see FIG. 5).

FIG. 8 is an example diagram for explaining a count value and a normal status check bit according to some embodiments. A case where the preset number of times is five times will be described below as a non-limiting example. However, embodiments are not limited thereto, and the preset number of times used as a criterion for determining whether program data is normal may be any one of integers equal to or greater than two according to some embodiments.

Referring to FIG. 8, DQ corresponds to the current program data received by the comparator 383 (see FIG. 7) from the data receiver circuit 381 (see FIG. 7). In addition, prev. DQ corresponds to the previous program data received by the comparator 383 (see FIG. 7) from the data saving latch 382 (see FIG. 7). The count value initially stored in the counter 384 (see FIG. 7) is zero. Later, when the '00' pattern is repeated once, the count value is increased by one to become one. When the '00' pattern is repeated twice, the count value is also increased by one to become two. Then, since the '00' pattern is no longer repeated, the count value is initialized or set to zero. In this case, the counting restarts from zero. Accordingly, the status check bit generator 385 (see FIG. 7) generates a normal status check bit (a bit value of 0) and sends the normal status check bit to the storage controller 200 (see FIG. 5). Although the '00' pattern is used in this non-limiting example, any pattern that is repeatedly received may be counted.

FIG. 9 is an example diagram for explaining a count value and an abnormal status check bit according to some embodiments. Any description overlapping the above description will be omitted below.

Referring to FIG. 9, the count value is increased by one whenever the '00' pattern is repeated once. Here, if the '00' pattern is repeated five times which is the preset number of times, the count value becomes four. Accordingly, the status check bit generator 385 (see FIG. 7) generates an abnormal status check bit (a bit value of 1). After that, even if the '00' pattern is no longer repeated and thus the count value is initialized to zero, the value of the status check bit does not change from one, and the status check bit generator 385 (see FIG. 7) continues to send the abnormal status check bit (a bit value of 1) to the storage controller 200 (see FIG. 5).

Figure 10:
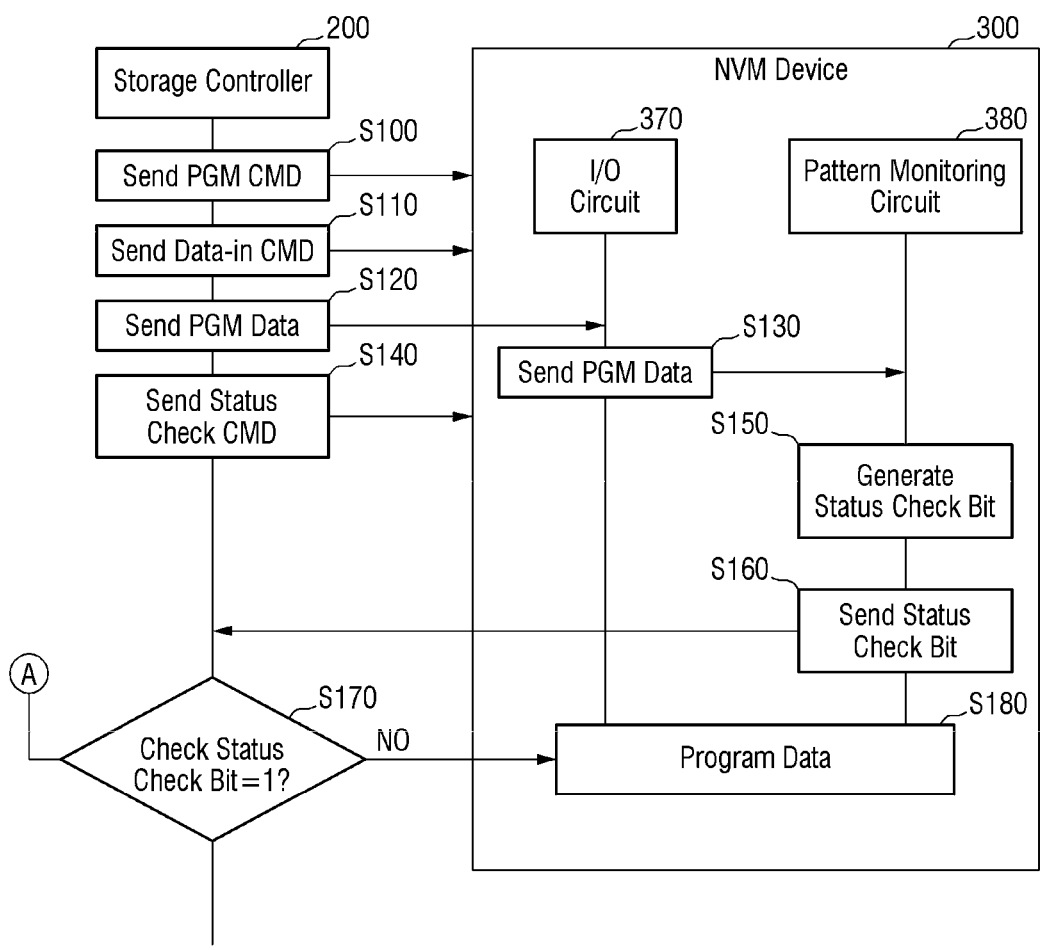
FIGS. 10 and 11 are flowcharts illustrating the operation of the storage device according to some embodiments.
Figure 11:
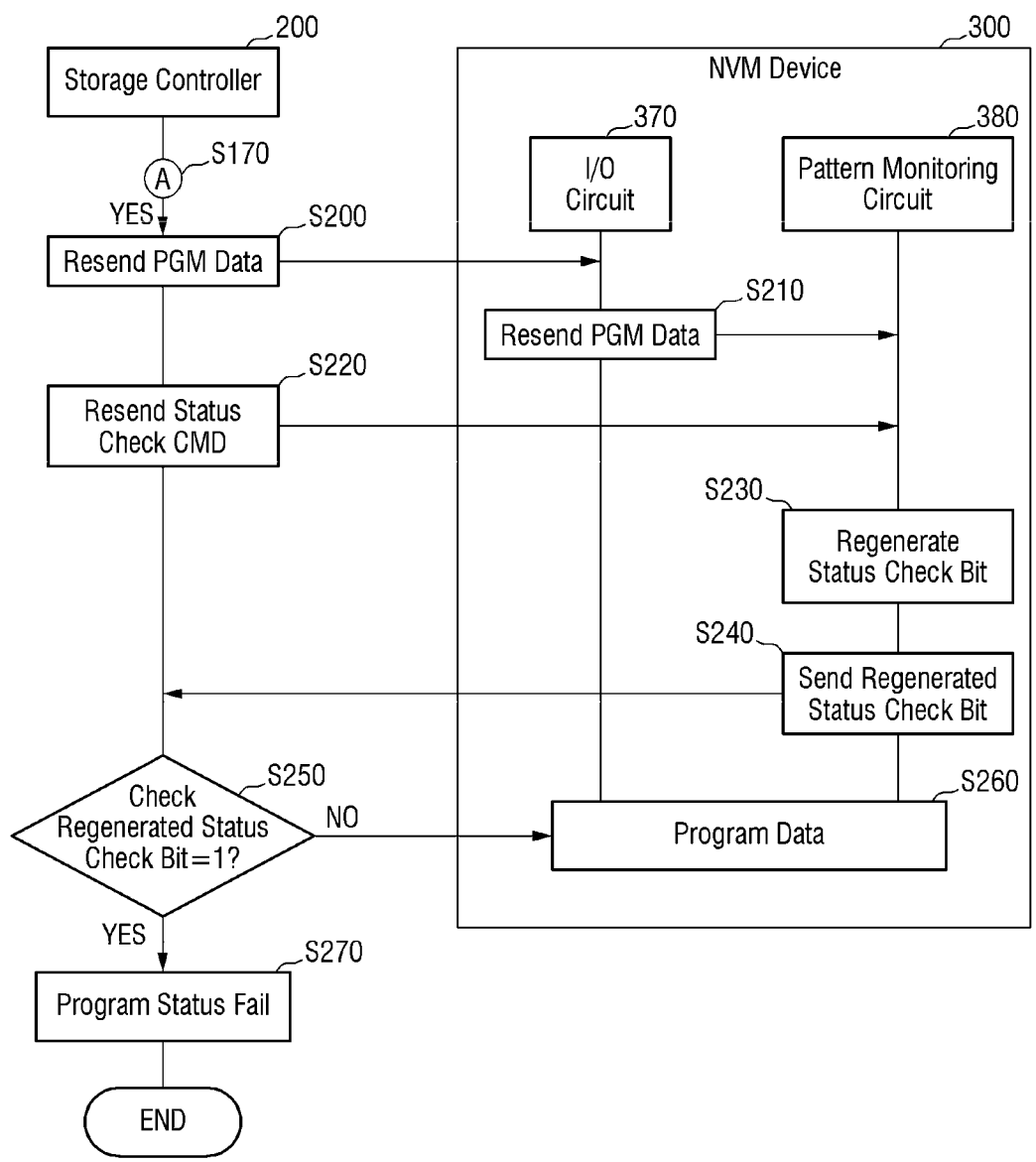

FIGS. 10 and 11 are flowcharts illustrating the operation of the storage device 100 according to some embodiments.

First, referring to FIG. 10, the storage controller 200 sends a program command to the non-volatile memory device 300 (operation S100). Then, when the storage controller 200 sends a data input command to the non-volatile memory device 300 (operation S110), it sends program data randomized by the randomizer 219 (see FIG. 5) to the input/output circuit 370 of the non-volatile memory device 300 (operation S120). Then, the input/output circuit 370 sends the program data to the pattern monitoring circuit 380 (operation S130).

Next, the storage controller 200 sends a status check command for checking the memory state to the non-volatile memory device 300 (operation S140). The pattern monitoring circuit 380 may generate a status check bit in response to the status check command (operation S150) and send the status check bit to the storage controller 200 (operation S160). The generation of the status check bit by the pattern monitoring circuit 380 will be described later with reference to FIGS. 12 and 13.

The storage controller 200 determines whether the value of the status check bit received from the pattern monitoring circuit 380 is one (operation S170, node A). When the value of the status check bit is not one (N in operation S170), the storage controller 200 determines that the program data sent to the non-volatile memory device 300 is normal, and the non-volatile memory device 300 performs a program operation on the received program data (operation S180).

Next, referring to FIG. 11, when the value of the status check bit is one (Y in operation S170), the storage controller 200 resends the program data to the input/output circuit 370 of the non-volatile memory device 300 (operation S200). Then, the input/output circuit 370 resends the program data to the pattern monitoring circuit 380 (operation S210). After that, the storage controller 200 resends the status check command to the non-volatile memory device 300 (operation S220), and the pattern monitoring circuit 380 regenerates the status check bit in response to the status check command (operation S230). Then, the pattern monitoring circuit 380 sends the regenerated status check bit to the storage controller 200 (operation S240).

The storage controller 200 determines whether the value of the regenerated state check bit received from the pattern monitoring circuit 380 is one (operation S250). When the value of the regenerated status check bit is not one (N in operation S250), the storage controller 200 determines that the program data resent to the non-volatile memory device 300 is normal, and the non-volatile memory device 300 performs a program operation on the program data (operation S260). When the value of the regenerated status check bit is one (Y in operation S250), the storage controller 200 processes the program data as a program status fail (PSF), and the non-volatile memory device 300 does not perform a program operation on the program data.

As described above, in some embodiments, when the storage controller 200 receives an abnormal status check bit from the non-volatile memory device 300, it may resend program data to the non-volatile memory device 300 once more because the abnormal status check bit may correspond to a temporary error such as a glitch. However, when the abnormal status check bit is still received after the retransmission of the program data, the storage controller 200 may process the program data as a PSF and may not perform a program operation on the program data. In this case, in some embodiments, the storage controller 200 may improve signal integrity (SI) characteristics of the non-volatile memory device 300 by controlling an input/output frequency of the non-volatile memory device 300 to be lowered.

As described above, in some embodiments, whether abnormal data is programmed into the non-volatile memory device 300 may be checked before the non-volatile memory device 300 performs a program operation. Therefore, it is possible to prevent the occurrence of an uncorrectable error correction code (UECC) in advance. However, in some other embodiments, the storage controller 200 may perform the operation of checking the value of the status check bit once more after sending a program confirm command to the non-volatile memory device 300. In some other embodiments, whether program data is abnormal may be checked by checking the value of the status check bit while the non-volatile memory device 300 performs a program operation or after the non-volatile memory device 300 completes the program operation.

Figure 12:
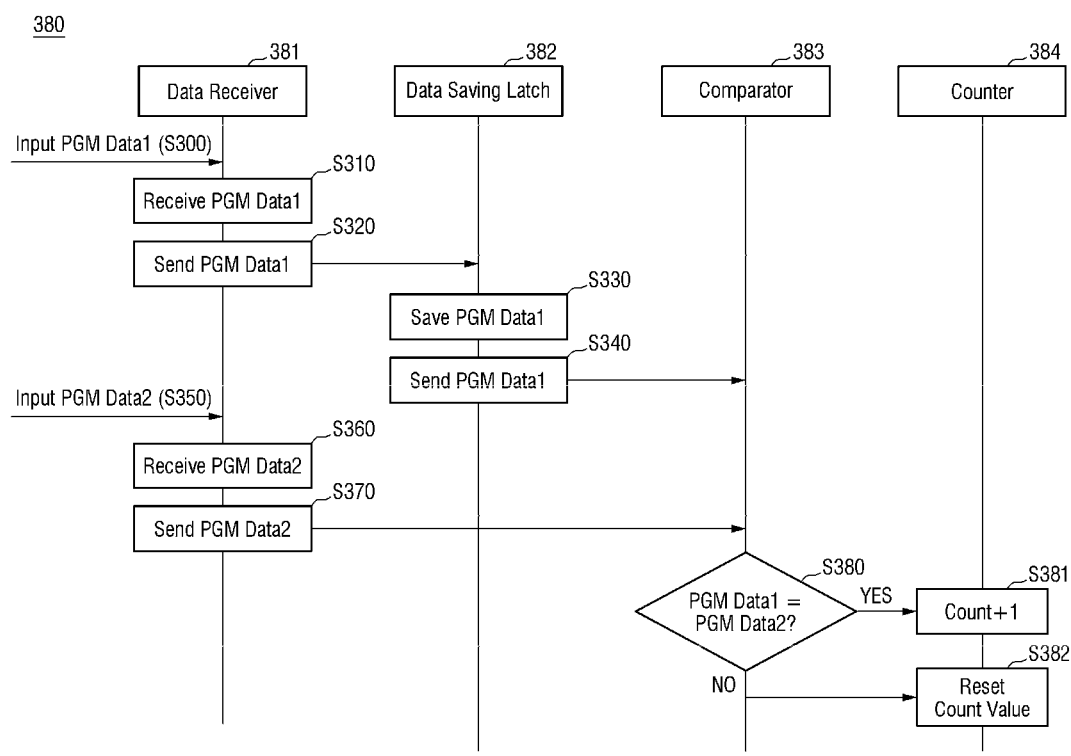
FIG. 12 is a flowchart illustrating the operation of the pattern monitoring circuit according to some embodiments.

FIG. 12 is a flowchart illustrating the operation of the pattern monitoring circuit 380 according to some embodiments.

First, first program data is input from the input/output circuit 370 (see FIG. 5) to the pattern monitoring circuit 380 (operation S300), and the data receiver circuit 381 receives the first program data (operation S310). Then, the data receiver circuit 381 sends the first program data to the data saving latch 382 (operation S320). The data saving latch 382 stores the first program data received from the data receiver circuit 381 (operation S330) and sends the first program data to the comparator 383 (operation S340).

Next, second program data is input from the input/output circuit 370 (see FIG. 5) to the pattern monitoring circuit 380 (operation S350), and the data receiver circuit 381 receives the second program data (operation S360). Then, the data receiver circuit 381 sends the second program data to the comparator 383 (operation S370). The comparator 383 determines whether the first program data received from the data saving latch 382 matches the second program data received from the data receiver circuit 381 (operation S380). When the first program data and the second program data match (Y in operation S380), the counter 384 increases the count value by one (operation S381). When the first program data and the second program data do not match (N in operation S380), the counter 384 initializes the count value to zero (operation S382). In this way, the counter 384 may generate and store the count value based on whether the first program data and the second program data sequentially input to the pattern monitoring circuit 380 match.

Figure 13:
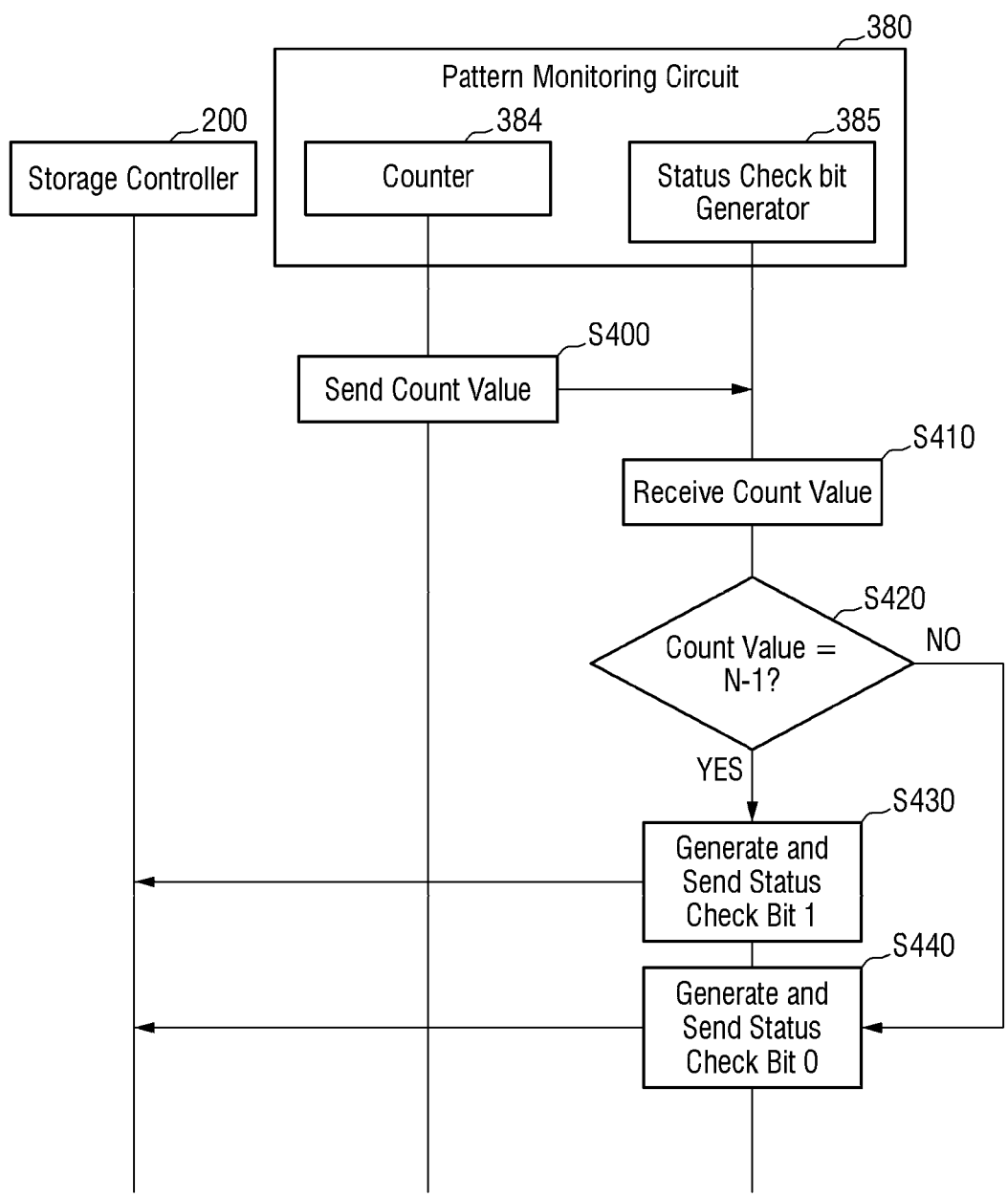
FIG. 13 is a flowchart illustrating the operation of a storage controller and the pattern monitoring circuit according to some embodiments.

FIG. 13 is a flowchart illustrating the operation of the storage controller 200 and the pattern monitoring circuit 380 according to some embodiments.

The counter 384 sends a stored count value to the status check bit generator 385 (operation S400). The status check bit generator 385 receives the count value (operation S410) and determines whether the count value is smaller than a preset number of times (N times) by one (operation S420). When the count value is smaller than the preset number of times (N times) by one (Y in operation S420), the status check bit generator 385 generates an abnormal status check bit having a bit value of 1 and sends the abnormal status check bit to the storage controller 200 (operation S430). When the count value is not smaller than the predetermined number of times (N times) by one (N in operation S420), the status check bit generator 385 generates a normal status check bit having a bit value of 0 and sends the normal status check bit to the storage controller 200 (operation S440).

Figure 14:
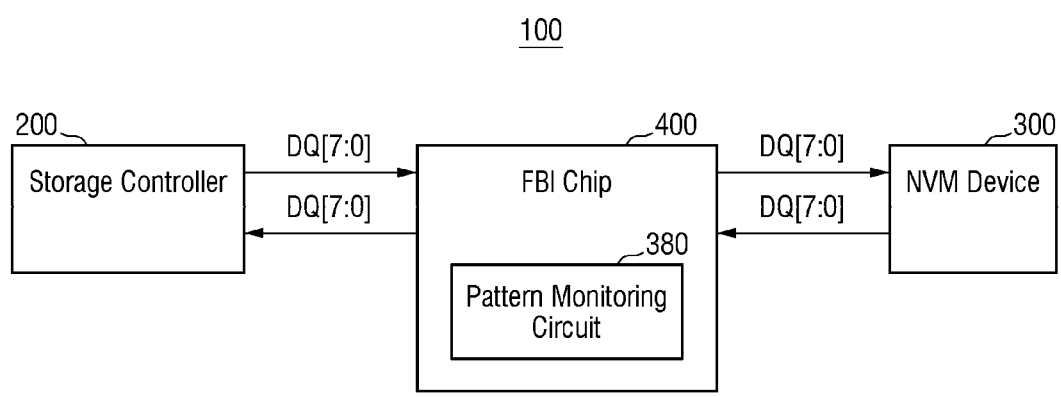
FIG. 14 is a block diagram of a storage device including a pattern monitoring circuit according to some embodiments.

FIG. 14 is a block diagram of a storage device 100 including a pattern monitoring circuit 380 according to some embodiments.

Referring to FIG. 14, in some embodiments, the storage device 100 may further include a frequency boosting interface (FBI) chip 400, unlike in FIG. 5. The FBI chip 400 is disposed between a storage controller 200 and a non-volatile memory device 300. Therefore, the FBI chip 400 may receive data from the storage controller 200 and transfer the data to the non-volatile memory device 300 and may receive data from the non-volatile memory device 300 and transfer the data to the storage controller 200. Although only one non-volatile memory device 300 is illustrated in FIG. 14, a plurality of non-volatile memory devices 300 communicating data with the FBI chip 400 may be implemented.

In some embodiments, the pattern monitoring circuit 380 may be disposed within the FBI chip 400. In this case, the storage controller 200 may send a status check command that can be recognized by the FBI chip 400 to the FBI chip 400. The pattern monitoring circuit 380 disposed inside the FBI chip 400 may send a status check bit regarding program data received from the storage controller 200 to the storage controller 200 in response to the status check command. In this way, the pattern of data programmed into the non-volatile memory device 300 is preemptively monitored by the pattern monitoring circuit 380 disposed in the FBI chip 400. Therefore, an error in the program data can be quickly identified compared with when the pattern of the program data is monitored for each of the non-volatile memory devices 300.

Figure 15:
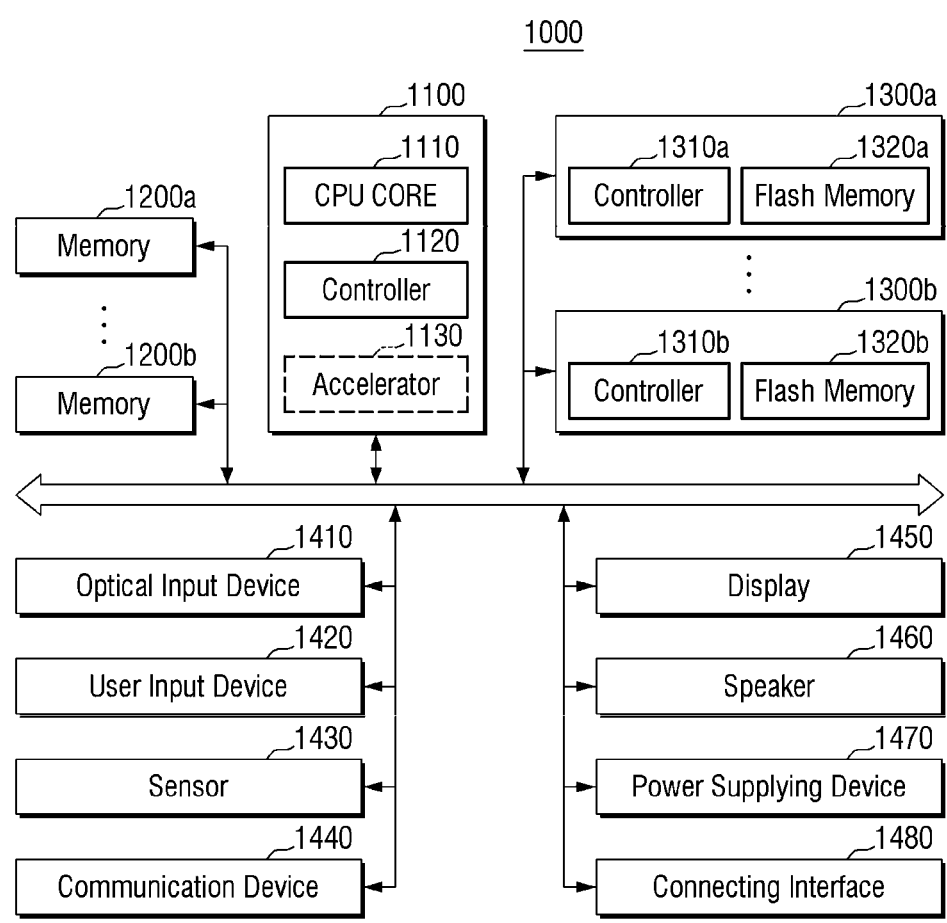
FIG. 15 illustrates a system to which a storage system according to some embodiments is applied.

FIG. 15 illustrates a electronic system 1000 to which a storage system according to some embodiments is applied.

The electronic system 1000 of FIG. 15 may be basically a mobile system such as a portable communication terminal (mobile phone), a smartphone, a tablet personal computer, a wearable device, a healthcare device, or an Internet of things (IOT) device. However, the electronic system 1000 of FIG. 15 is not necessarily limited to the mobile system and may also be a personal computer, a laptop computer, a server, a media player, or an automotive device such as a navigation device.

Referring to FIG. 15, the electronic system 1000 may include a main processor 1100, memories 1200a through 1200b and storage devices 1300a through 1300b and may additionally include one or more of an optical input device 1410, a user input device 1420, a sensor 1430, a communication device 1440, a display 1450, a speaker 1460, a power supplying device 1470 and a connecting interface 1480.

The main processor 1100 may control the overall operation of the electronic system 1000, more specifically, may control the operation of other components included in the electronic system 1000. The main processor 1100 may be implemented as a general-purpose processor, a dedicated processor, or an application processor.

The main processor 1100 may include one or more CPU cores 1110 and may further include a controller 1120 for controlling the memories 1200a through 1200b and/or the storage devices 1300a through 1300b. According to some embodiments, the main processor 1100 may further include an accelerator block 1130 which is a dedicated circuit for high-speed data operation such as artificial intelligence (AI) data operation. The accelerator block 1130 may include a graphics processing unit (GPU), a neural processing unit (NPU) and/or a data processing unit (DPU) and may be implemented as a separate chip physically independent of other components of the main processor 1100.

The memories 1200a through 1200b may be used as main memory devices of the electronic system 1000 and may include volatile memories such as static random access memories (SRAMs) and/or dynamic random access memories (DRAMs), but may also include non-volatile memories such as flash memories, PRAMs and/or RRAMs. The memories 1200a through 1200b may also be implemented in the same package with the main processor 1100.

The storage devices 1300a through 1300b may function as non-volatile storage devices that store data regardless of whether power is supplied and may have a relatively larger storage capacity than the memories 1200a through 1200b. The storage devices 1300a through 1300b may respectively include storage controllers 1310a through 1310b and non-volatile memories 1320a through 1320b which store data under the control of the storage controllers 1310a through 1310b. The non-volatile memories 1320a through 1320b may include V-NAND flash memories having a 2D structure or a 3D structure but may also include other types of non-volatile memories such as PRAMs and/or RRAMs.

The storage devices 1300a through 1300b included in the electronic system 1000 may be physically separated from the main processor 1100 or may be implemented in the same package with the main processor 1100. In addition, the storage devices 1300a through 1300b may be in the form of SSDs or memory cards and thus may be detachably coupled to other components of the electronic system 1000 through an interface such as the connecting interface 1480 which will be described later. The storage devices 1300a through 1300b may be, but are not necessarily limited to, devices to which a standard protocol such as UFS, eMMC, or NVMe is applied.

The optical input device 1410 may capture still images or moving images and may be a camera, a camcorder, and/or a webcam.

The user input device 1420 may receive various types of data from a user of the electronic system 1000 and may be a touch pad, a keypad, a keyboard, a mouse and/or a microphone.

The sensor 1430 may detect various types of physical quantities that can be obtained from outside the electronic system 1000 and may convert the detected physical quantities into electrical signals. The sensor 1430 may be a temperature sensor, a pressure sensor, an illuminance sensor, a position sensor, an acceleration sensor, a biosensor, and/or a gyroscope sensor.

The communication device 1440 may transmit and receive signals to and from other devices outside the electronic system 1000 according to various communication protocols. The communication device 1440 may include an antenna, a transceiver, and/or a modem.

The display 1450 and the speaker 1460 may function as output devices that respectively output visual information and audio information to the user of the electronic system 1000.

The power supplying device 1470 may appropriately convert power supplied from a battery (not illustrated) embedded in the electronic system 1000 and/or an external power source and supply the power to each component of the electronic system 1000.

The connecting interface 1480 may provide a connection between the electronic system 1000 and an external device which is connected to the electronic system 1000 to exchange data with the electronic system 1000. The connecting interface 1480 may be implemented as various interfaces such as an advanced technology attachment (ATA) interface, a serial-ATA (SATA) interface, an external SATA (e-SATA) interface, a small computer small interface (SCSI) interface, a serial attached SCSI (SAS) interface, a peripheral component interconnect (PCI) interface, a PCI express (PCIe) interface, an NVM express (NVMe), IEEE 1394, a universal serial bus (USB) interface, a secure digital (SD) card interface, a multi-media card (MMC) interface, an eMMC interface, a UFS interface, an embedded UFS (eUFS) interface, and/or a compact flash (CF) card interface.

While the present disclosure has been particularly illustrated and described with reference to example embodiments thereof, it will be understood by those of ordinary skill in the art that various changes in form and detail may be made therein without departing from the spirit and scope of the present disclosure as defined by the following claims. The example embodiments should be considered in a descriptive sense only and not for purposes of limitation.

What is claimed is:

1. A storage device comprising:
    a storage controller configured to send a command and configured to send program data including a pattern of one or more bits;
    a non-volatile memory device configured to receive the command and configured to receive the program data; and
    a pattern monitoring circuit configured to monitor the program data from the storage controller for a pattern,
    wherein the storage controller comprises a randomizer circuit configured to randomize an order of groups of bits of the program data,
    wherein the pattern monitoring circuit is configured to send an abnormal status check bit to the storage controller when the program data includes repeated patterns that are repeated a preset number of times or more, and
    wherein the storage controller is configured to resend the program data to the non-volatile memory device in response to receiving the abnormal status check bit.

2. The storage device of claim 1, wherein the non-volatile memory device does not perform a program operation on the program data when the program data that is resent includes repeated patterns that are repeated the preset number of times or more.

3. The storage device of claim 2, wherein the storage controller is configured to lower an input/output frequency of the non-volatile memory device responsive to not performing the program operation.

4. The storage device of claim 1, wherein the pattern monitoring circuit comprises:
    a data receiver circuit configured to receive the program data; and
    a data saving latch configured to receive the program data from the data receiver circuit and configured to store the program data that was received.

5. The storage device of claim 4, wherein the pattern monitoring circuit further comprises a comparator configured to compare data stored in the data receiver circuit with data stored in the data saving latch.

6. The storage device of claim 5, wherein the pattern monitoring circuit further comprises a counter configured to increase a count value by one when the data stored in the data receiver circuit matches the data stored in the data saving latch.

7. The storage device of claim 6, wherein the pattern monitoring circuit further comprises a status check bit generator configured to generate the abnormal status check bit or a normal status check bit based on the count value.

8. The storage device of claim 7, wherein the status check bit generator is configured to generate the abnormal status check bit when the count value stored in the counter is less than the preset number of times by one.

9. The storage device of claim 6, wherein the counter sets the count value to zero when the data stored in the data receiver circuit does not match the data stored in the data saving latch.

10. The storage device of claim 1, wherein the pattern monitoring circuit is configured to send a normal status check bit to the storage controller when the program data is not repeatedly received the preset number of times or more.

11. The storage device of claim 10, wherein the non-volatile memory device is configured to perform a program operation on the program data when the pattern monitoring circuit sends the normal status check bit to the storage controller.

12. The storage device of claim 1, wherein the pattern monitoring circuit is in the non-volatile memory device.

13. A method of operating a non-volatile memory device, the method comprising:
receiving a program command from a storage controller;
receiving a data input command from the storage controller;
receiving program data including a pattern of one or more bits from the storage controller;
receiving a status check command from the storage controller;
monitoring the program data;
generating an abnormal status check bit when the program data includes repeated patterns that are repeated a preset number of times or more;
sending the abnormal status check bit to the storage controller; and
receiving resent program data from the storage controller based on the abnormal status check bit,
wherein the resent program data is the program data received again from the storage controller.

14. The method of claim 13, wherein the monitoring the program data is performed by a frequency boosting interface (FBI) chip that is between the storage controller and the non-volatile memory device.

15. The method of claim 13, wherein a program operation is not performed on the program data when the resent program data that is resent includes repeated patterns that are repeated the preset number of times or more, and
wherein the storage controller is configured to process the program data as a program status fail (PSF) when the resent program data that is resent includes repeated patterns that are repeated the preset number of times or more.

16. The method of claim 13, further comprising storing the program data received from the storage controller in a data latch.

17. A non-volatile memory device comprising:
an input/output circuit configured to receive randomized program data from a storage controller; and
a pattern monitoring circuit configured to receive the randomized program data from the input/output circuit and configured to monitor the randomized program data for a pattern,
wherein the pattern monitoring circuit comprises a counter that is configured to generate a count value based on whether the randomized program data is repeated, a status check bit generator configured to generate a status check bit based on the count value and configured to send the status check bit to the storage controller.

18. The non-volatile memory device of claim 17, wherein the pattern monitoring circuit is configured to send an abnormal status check bit to the storage controller when the randomized program data is repeatedly received a preset number of times or more.

19. The non-volatile memory device of claim 18, wherein the input/output circuit is configured to receive resent randomized program data when the storage controller receives the abnormal status check bit.

20. The non-volatile memory device of claim 18, wherein the status check bit generator is configured to generate the abnormal status check bit when the count value is less than the preset number of times by one and configured to generate a normal status check bit when the count value is less than the preset number of times by two or more.

* * * * *